(12) United States Patent
Ratza et al.

(10) Patent No.: US 6,302,367 B1
(45) Date of Patent: Oct. 16, 2001

(54) FISHING ROD HOLDER

(75) Inventors: Clifton J. Ratza, Grand Rapids; Christopher A. Rossman, Comstock Park, both of MI (US)

(73) Assignee: Attwood Corporation, Lowell, MI (US)

( * ) Notice: Subject to any disclaimer, the term of this patent is extended or adjusted under 35 U.S.C. 154(b) by 0 days.

(21) Appl. No.: 09/460,016

(22) Filed: Dec. 13, 1999

(51) Int. Cl.[7] ................................................. A01K 97/10
(52) U.S. Cl. ............................................. 248/515; 43/21.2
(58) Field of Search .............................. 248/278.1, 514, 248/515, 520, 521, 534, 535, 538, 539; 43/21.2, 54.1; 224/922

(56) References Cited

U.S. PATENT DOCUMENTS

| | | | |
|---|---|---|---|
| D. 306,396 | 3/1990 | Brushaber | D8/355 |
| 4,363,561 | 12/1982 | Hsieh | 403/92 |
| 4,807,384 | 2/1989 | Roberts, Sr. | 43/17 |
| 4,827,654 | 5/1989 | Roberts | 43/21.2 |
| 4,830,250 | 5/1989 | Newbold et al. | 224/314 |
| 4,932,152 | 6/1990 | Barlotta et al. | 43/21.2 |
| 5,054,737 | 10/1991 | DeLancey | 248/515 |
| 5,056,699 | 10/1991 | Newbold et al. | 224/314 |
| 5,121,565 | 6/1992 | Wille et al. | 43/4 |
| 5,142,809 | 9/1992 | O'Brien et al. | 43/21.2 |
| 5,211,323 | 5/1993 | Chimenti et al. | 224/314 |
| 5,231,785 | 8/1993 | Roberts | 43/21.2 |
| 5,257,855 | 11/1993 | Nagano | 301/110.5 |
| 5,313,734 | 5/1994 | Roberts | 43/21.2 |
| 5,362,173 | 11/1994 | Ng | 903/320 |
| 5,363,996 | 11/1994 | Raaber et al. | 224/314 |
| 5,367,815 | 11/1994 | Liou | 43/21.2 |
| 5,409,321 | 4/1995 | Chen | 403/321 |
| 5,438,789 | 8/1995 | Emory | 43/21.2 |
| 5,501,028 | 3/1996 | Hull et al. | 43/17 |
| 5,722,630 | 3/1998 | Chu et al. | 248/514 |
| 5,761,844 | 6/1998 | Horschel | 43/21.2 |
| 5,772,048 | 6/1998 | Sopcisak | 211/20 |
| 5,782,308 | 7/1998 | Latten et al. | 72/481.6 |
| 5,871,196 | 2/1999 | Martelli | 248/514 |

OTHER PUBLICATIONS

"Rhode Gear" Bicycle Carrier by Rhode Gear U.S.A., Providence, Rhode Island (3 pages), dated prior to Dec. 13, 1999.

Primary Examiner—Leslie A. Braun
Assistant Examiner—Jon Szumny
(74) Attorney, Agent, or Firm—Price, Heneveld, Cooper, DeWitt & Litton

(57) ABSTRACT

A fishing rod holder includes a cradle shaped to receive and selectively retain a fishing rod therein, and includes a first ratchet half thereon. A support pedestal that has a mount for attaching the fishing rod holder to a support surface, and includes a second ratchet half shaped to selectively lockingly engage with the first ratchet half. A quick-release connector mechanism permits angular adjustment between the cradle and the support pedestal. The quick-release connector mechanism includes an actuator pin extending centrally between the first and second ratchet halves, and rotatably connecting the cradle and the support to permit mutual rotation between a variety of different cradle positions. The actuator pin has a fixed end associated with one of the cradle and the spark pedestal, and a free end associated with the other of the cradle and support pedestal. The quick-release connector mechanism has an actuator lever pivotally operably connected with the free end of the actuator pin, and a cam configured to selectively engage the other of the cradle and the support pedestal when rotated to a locked position, wherein the first and second ratchet halves are converged to retain the cradle at a preselected position relative to the support pedestal. The actuator lever is shiftable to an unlocked position wherein the first and second ratchet halves are separated, such that the cradle may be rotated relative to the support pedestal.

27 Claims, 2 Drawing Sheets

US 6,302,367 B1

FISHING ROD HOLDER

BACKGROUND OF THE INVENTION

The present invention relates to fishing rod holders and the like, and in particular to a fishing rod holder including a quick-release adjustment mechanism.

Fishing rod holders are used in recreation and sport fishing to hold fishing rods and associated fishing reels in a preselected position, thus allowing hands free use of the fishing rod/reel combination. Some such fishing rod holders allow the user to adjust the position of the fishing rod relative to a horizontal plane, thereby changing the angle formed between the fishing rod and the horizontal plane.

Heretofore, adjustment of such fishing rod holders has been somewhat clumsy and/or inefficient. Some designs for fishing rod holders have incorporated the use of two mating ratchet halves with threaded adjustment screws that hold the ratchet halves in matable contact with one another. To adjust the such fishing rod holders, the user must unscrew the adjustment screw to the point where clearance between the ratchet halves is sufficient to allow adjustment of the fishing rod holder. The user then adjusts the position of the fishing rod holder to a new desired position, and must then retighten the adjustment screw. This method of adjustment can be rather inefficient and inconvenient.

SUMMARY OF THE INVENTION

One aspect of the present invention is to provide a fishing rod holder that includes a cradle shaped to receive and selectively retain a fishing rod therein, and a first ratchet half thereon. A support pedestal has a mount for attaching the fishing rod holder to a support surface, and includes a second ratchet half shaped to selectively lockingly engage with the first ratchet half. The fishing rod holder further includes a quick-release connector mechanism to permit angular adjustment between the cradle and the support pedestal. The quick-release connector mechanism includes an actuator pin extending centrally between the first and second ratchet halves, which rotatably connects the cradle and the support to permit mutual rotation between a variety of different cradle positions. The actuator pin has a fixed end associated with one end of the cradle and the support pedestal, and a free end associated with the other of the cradle and the support pedestal. The quick-release connector mechanism further includes an actuator lever pivotally operably connected with the free end of the actuator pin, with a cam configured to selectively engage the other of the cradle and the support pedestal when rotated to a locked position, wherein the first and second ratchet halves are converged to retain the cradle at a preselected position relative to the support pedestal, and an unlocked position wherein the first and second ratchet halves are separated and the cradle may be rotated relative to the support pedestal.

Another aspect of the present invention is to provide a method for adjusting a fishing rod holder that includes providing a cradle shaped to receive and selectively retain a fishing rod therein, having a first ratchet half thereon, and providing a support pedestal having a mount for attaching the fishing rod holder to a support surface, and includes a second ratchet shaped to selectively lockingly engage with the first ratchet half. The method further includes providing a quick-release connector mechanism that includes an actuator pin extending centrally between the first and second ratchet halves, and rotatably connecting the cradle with the support to permit mutual rotation between a variety of different cradle positions, wherein the actuator pin has a fixed end associated with one of the cradle and support pedestal, and a free end associated with the other of the cradle and the support pedestal, and an actuator lever pivotally connected with the free end of the actuator pin. A cam is configured to selectively engage the other of the cradle and the support pedestal when rotated to a locked position wherein the first and the second ratchet halves are converged to retain the cradle at a preselected position relative to the support pedestal. The method still further includes angularly adjusting the cradle relative to the support pedestal by rotating the actuator lever to the unlocked position, rotating the cradle, and then rotating the actuator lever to the locked position.

The principal objects of the present invention are to provide a fishing rod holder that is particularly adapted to allow quick and easy rotational adjustment of a fishing rod/reel combination held within a cradle portion of the fishing rod holder. A quick-release mechanism incorporated within the fishing rod holder greatly improves the efficiency and ease by which the rotational adjustment can be made, by eliminating the locking screw devices typically associated with adjustable fishing rod holders. In addition, the fishing rod holder includes a mount that allows for the easy pivotal adjustment thereof.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
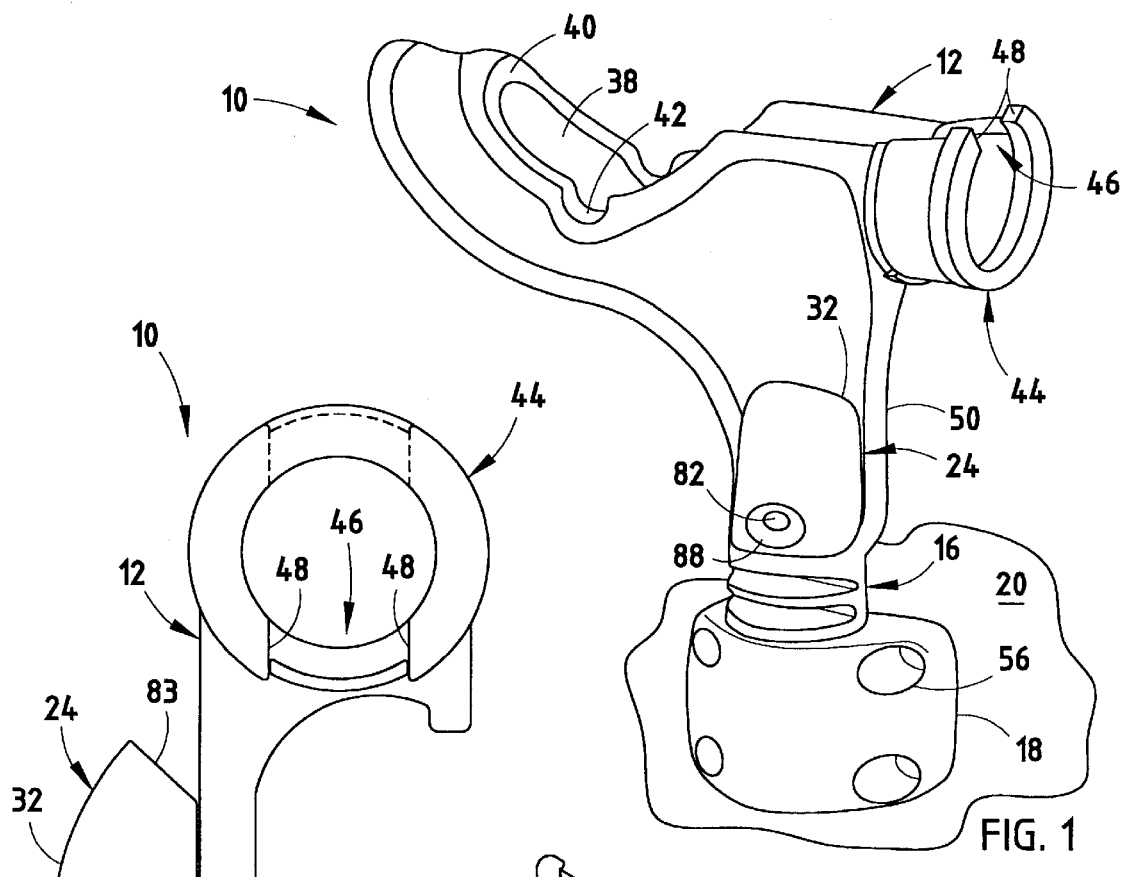
FIG. 1 is a perspective view of a fishing rod holder embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
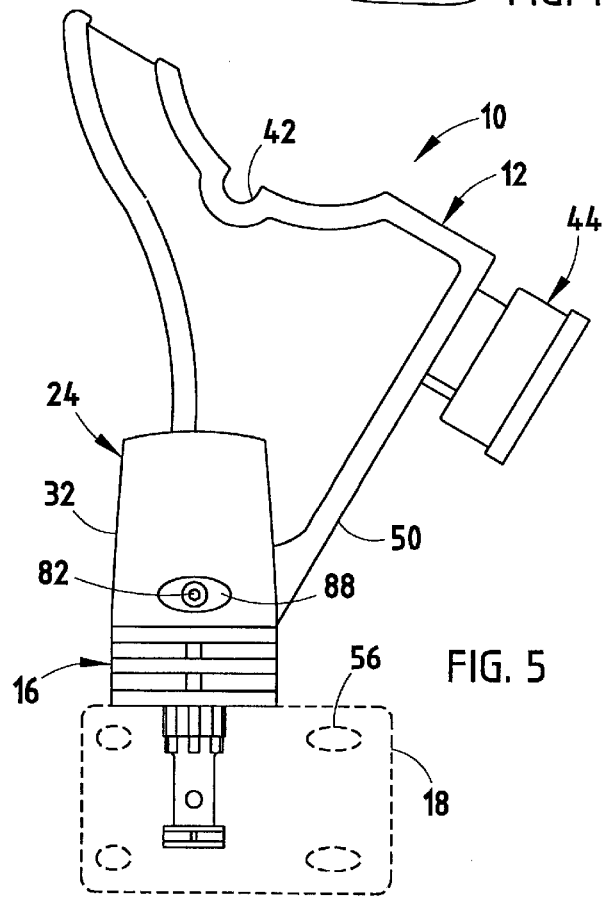
FIG. 5 is a side view of the fishing rod holder shown in a tilted position.

The reference numeral 10 (FIG. 1) generally designates a fishing rod holder embodying the present invention. Fishing rod holder 10 includes a cradle 12 that is shaped to receive and selectively retain a fishing rod therein, and includes a first ratchet half 14 (FIG. 2) thereon. Fishing rod holder 10 further includes a support comprising a mount 18 for attaching fishing rod holder 10 to a support surface 20, and a pedestal 21 that includes a second ratchet half 22 shaped to selectively lockingly engage with first ratchet half 14. Fishing rod holder 10 still further includes a quick-release connector mechanism 24 that permits angular adjustment between cradle 12 and support pedestal 16. Connector mechanism 24 includes an actuator pin 26 that extends centrally between first ratchet half 14 and second ratchet half 22, and rotatably connects cradle 12 with support pedestal 16 to permit mutual rotation between a variety of different cradle positions, as shown in FIGS. 1 and 5. Actuator pin 26 has a fixed end 28 associated with cradle 12, and a free end 30 associated with support pedestal 24 and that includes a rounded head 82. Connector mechanism 24 further includes an actuator lever 32 pivotally operably connected with free end 30 of actuator pin 26. Actuator lever 32 has a first cam surface 34 and a second cam surface 36 adapted to selectively engage support pedestal 16 when rotated between a locked position (FIG. 2), wherein first ratchet half 14 and second ratchet half 22 are converged to retain cradle 12 at a preselected position relative to support pedestal 16 and an unlocked position (FIG. 3) wherein first ratchet half 14 and second ratchet half 22 are separated, and cradle 12 may be rotated relative to support pedestal 16.

Figure 4:
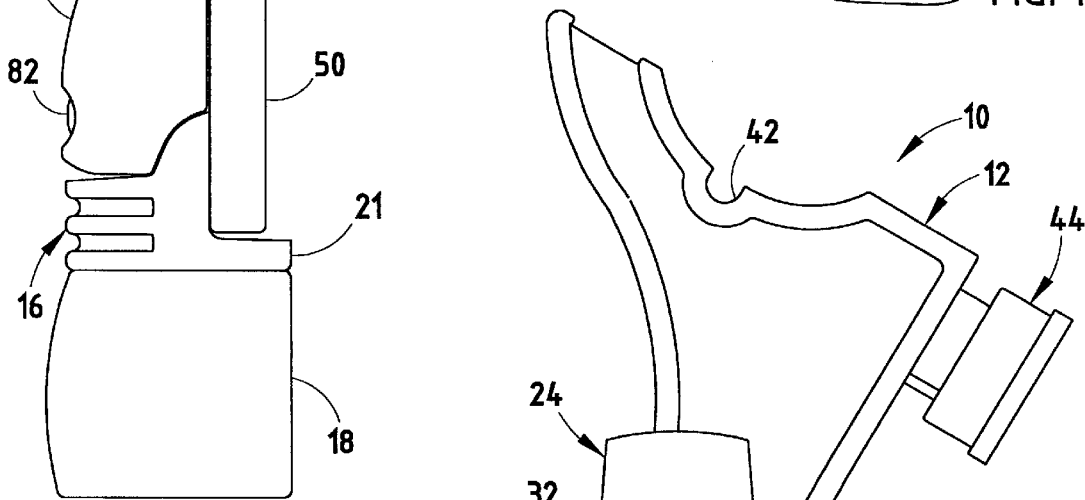
FIG. 4 is a front view of the fishing rod holder.

In the illustrated example, cradle 12 (FIG. 1) is provided with a generally cylindrical elongated shape and includes an elongated slot 38 extending lengthwise thereof that defines an upper wall 40. Wall 40 is provided with two recessed notches 42 located within upper wall 40 of slot 38 and that are juxtaposed from one another across slot 38. Notches 42 are adapted to receive the stem of a fishing reel therein, when the fishing rod/reel combination are placed within the fishing rod holder, thereby limiting the movement of the rod/reel combination along cradle 12. The illustrated cradle 12 is further provided with a forwardly located clamp 44 (FIG. 4) that is rotatably connected with cradle 12. Clamp 44 is circularly shaped and includes a gap 46 that defines spaced-apart ends 48. Clamp 44 is rotatable between an unlocked position (FIG. 1), wherein gap 46 is aligned with slot 38 of cradle 12, thereby allowing placement of the fishing rod within fishing rod holder 10 or the removal of the fishing rod therefrom, and a locked position (FIG. 4), wherein gap 46 is not aligned with slot 38 of cradle 12, thereby prohibiting removal of the fishing rod from within cradle 12.

Cradle 12 (FIGS. 1 and 2) further includes a downwardly extending arm 50 that includes the first ratchet half 14 on a lower portion thereof. First ratchet half 14 includes a plurality of radially extending teeth 52 arranged in a substantially circular pattern. First ratchet half 14 is provided with a centrally located stepped bore 53 that extends partially through arm 50, and defines a step 55 therein.

Figure 3:
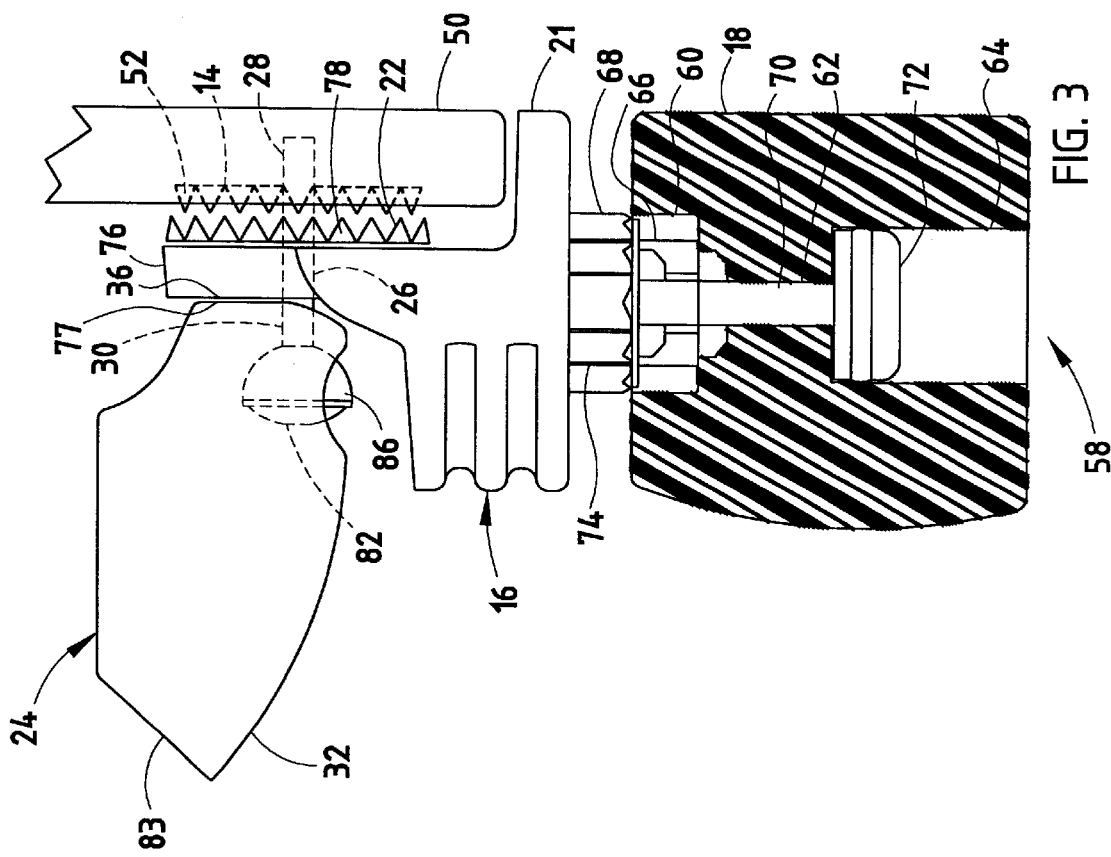
FIG. 3 is a vertical cross-sectional view of the locking mechanism and mount, wherein the locking mechanism is shown in an unlocked position.
Figure 2:
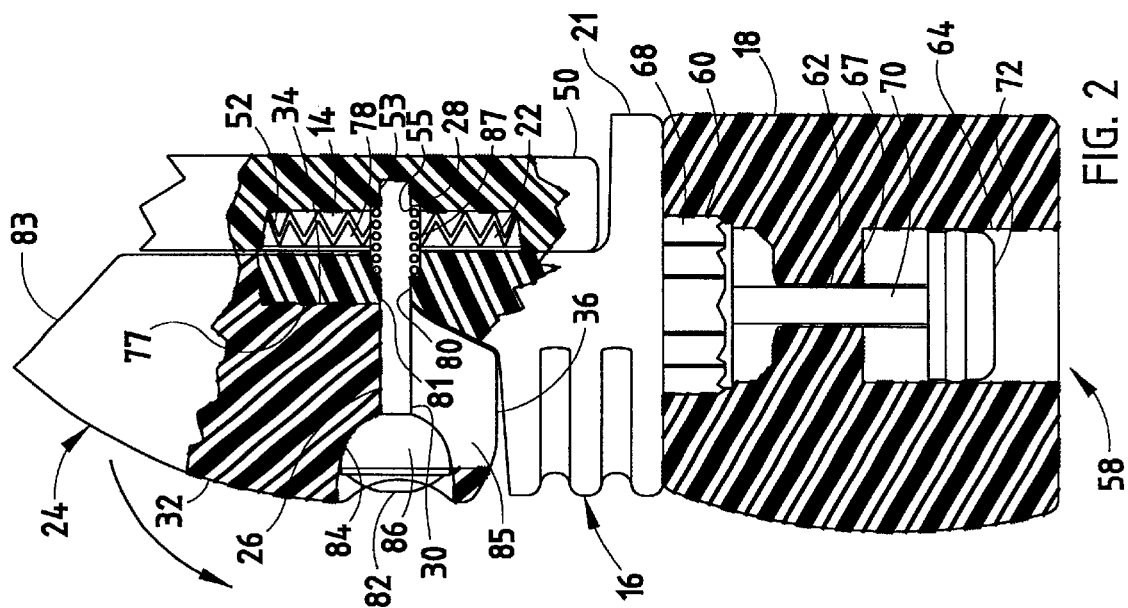
FIG. 2 is a vertical cross-sectional view of a locking mechanism and mount portions of the fishing rod holder, wherein the locking mechanism is shown in a locked position.

The support pedestal 16 illustrated in FIG. 1 includes mount 18 and pedestal 21. Mount 18 is provided with a plurality of mounting holes 56 that are adapted to receive mechanical fasteners such as self-tapping screws therein for attaching mount 18 to a surface such as the deck or gunwale of a fishing boat. Mount 18 further includes a centrally located stepped bore 58 (FIGS. 2 and 3). Bore 58 includes an upwardly opening first section 60, an intermediate narrowed section 62 and a downwardly opening third section 64. First section 60 of bore 58 is provided with a plurality of inwardly extending teeth 66. Third section 64 of bore 58 has a greater diameter than second section 62 of bore 58, thereby defining a step wall 67 therebetween.

The illustrated pedestal 21 includes a downwardly extending gear shaped section 68, a pivot pin 70 and a stop member 72. Gear shaped section 68 is provided with a plurality of teeth 74 that mesh with teeth 66 of first section 60 of bore 58 when pedestal 21 is placed within mount 18, thereby restricting pivotal movement of cradle 12 with respect to support pedestal 16. Pivot pin 70 is telescopingly received within second section 62 of bore 58. Stop member 72 is attached to pivot pin 70 and is located within third section 64 of bore 58.

To pivotally adjust cradle 12, an upward force is placed on cradle 12 which lifts support pedestal 16 and gear shaped section 68 of pedestal 21 from within first section 60 of bore 58 of mount 18, thereby allowing pivotal movement of pivot pin 70 within second section 62 of bore 58. After pivotal adjustment of cradle 12, the upward force being placed on cradle 12 is released and gear shaped section 68 of pedestal 21 is again received within first section 60 of bore 58 allowing teeth 74 of gear shaped section 68 to mesh with teeth 66 of first section 60 of bore 58, thereby preventing pivotal movement of cradle 12 with respect to support pedestal 16.

Support pedestal 16 further includes an arcuately shaped, upwardly extending arm 76 that includes the second ratchet half 22 on one side thereof and defines a cam wall 77 on an opposite side thereof. Second ratchet half 22 includes a plurality of radially extending teeth 78 that are arranged in a substantially circular pattern and that mateably engage with teeth 52 of first ratchet half 14. Second ratchet half 22 includes a centrally located stepped bore 80 that extends through arm 76 and that defines a step 81 therein.

The illustrated actuator lever 32 of connector mechanism 24 further includes an angled upper surface 83 that provides a space between actuator handle 32 and arm 50 of cradle 12, thereby allowing an operator easy access to handle 32 when connector mechanism 24 is in the locked position and a gripping surface to rotate handle 32 from the locked to the unlocked position. Actuator lever 32 still further includes a bowl shaped pivot surface or socket 84 that is adapted to receive head 82 of actuator pin 26 therein, and an inner channel 85.

Alternatively, connector mechanism 24 includes a bowl shaped washer 86 adapted to be received within bowl shaped socket 84 of actuator lever 32 and to receive the head 82 of actuator pin 26 therein. Washer 86 provides a pivot surface that allows easy rotation of actuator lever 32 between the locked and unlocked positions.

First cam surface 34 and second cam surface 36 of actuator lever 32 are in an orthogonal relationship to one another. The distance between pivot surface 84 of actuator lever 32 and first cam surface 34 is greater than the distance between pivot surface 84 of actuator lever 32 and second cam surface 36.

Connector mechanism 24 further includes a coil spring 87 located within bore 53 of first ratchet half 14 and bore 80 of second ratchet half 22 such that spring 87 contacts step 55 of bore 53 and step 81 of bore 80.

In assembly, actuator pin 26 extends through channel 85 of actuator lever 32, through bore 80 of second ratchet half 22, and is fixedly received within bore 53 of first ratchet half 14.

In adjustment, the angular orientation of cradle 12 with respect to support pedestal 16 can be adjusted between a plurality of incremental positions corresponding to the mating positions between first ratchet half 14 and second ratchet half 22. In the locked position, first cam surface 34 of actuator lever 32 is in contact with cam wall 77 of pedestal 21 which holds second ratchet half 22 in mateable contact with first ratchet half 14 of cradle 12, thereby preventing cradle 12 from rotating relative to support pedestal 16. To pivotally adjust cradle 12 relative to support pedestal 16, the operator places a downward and outward force upon upper surface 83, thereby rotating actuator lever 32 about head 82 of actuator pin 26. Actuator lever 32 is pivoted until second cam surface 36 is in contact with cam wall 77 of pedestal 54, thereby allowing spring 87 to force actuator pin 26 to telescopingly slide within and relative to bore 80 of second ratchet half 22, and first ratchet half 14 and second ratchet half 22 to separate, thus allowing cradle 12 to be rotated relative to support pedestal 16. After a new position of the cradle 12 with respect to support pedestal 16 has been selected, actuator lever 32 is rotated from the unlocked position to the locked position by placing an upward and inward force on actuator lever 32, thereby returning to the locked position and prohibiting rotation of cradle 12 relative to support pedestal 16.

It should be noted that while connector mechanism 24 has been described in connection with support pedestal 16, connector mechanism 24 can be operably connected to arm 50 of cradle 12. More specifically, bore 53 of first ratchet half 14 may extend entirely through arm 50 of cradle 12, thereby allowing actuator lever 32 to be located on the opposite side of arm 50 and allowing actuator pin 26 to telescopingly extend through and relative to bore 53 and to be fixedly received within bore 80 of second ratchet half 22.

Quick-release connector mechanism 24 greatly improves the efficiency and ease by which the position of cradle 12, and thus the position of a fishing rod/reel combination located within cradle 12, can be adjusted relative to support pedestal 16.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fishing rod holder comprising:
a cradle shaped to receive and selectively retain a fishing rod therein, and having a first ratchet half thereon;
a support pedestal having a mount for attaching said fishing rod holder to a support surface, and including a second ratchet half shaped to selectively lockingly engage with said first ratchet half;
a quick-release connector mechanism to permit angular adjustment between said cradle and said support pedestal, including:
an actuator pin extending centrally between said first and second ratchet halves, and rotatably connecting said cradle with said support to permit mutual rotation between a variety of different cradle positions, said actuator pin having a first end associated with one of said cradle and said support pedestal, and a second end associated with the other of said cradle and said support pedestal; and
an actuator lever pivotally operably connected with the second end of said actuator pin, and having a cam configured to selectively engage the other of said cradle and said support pedestal when rotated to a locked position, wherein said first and second ratchet halves are converged to retain said cradle at a preselected position relative to said support pedestal, and an unlocked position wherein said first and second ratchet halves are separated and said cradle may be rotated relative to said support pedestal.

2. The fishing rod holder as set forth in claim 1, wherein:
said cam includes a first cam surface and a second cam surface, and wherein said first cam surface engages said support pedestal when said actuator lever is in said locked position, and said second cam surface engages said support pedestal when said actuator lever is in said unlocked position.

3. The fishing rod holder as set forth in claim 2, wherein:
said actuator lever of said quick-release connector includes a pivot socket; and
said second end of said pin has a rounded head, whereby said pivot socket of said actuator level pivots about said rounded head of said pin.

4. The fishing rod holder as set forth in claim 3, including:
a spring disposed between said first and second ratchet halves, and biasing said first and second ratchet halves towards the separated position when said actuator lever is in said unlocked position.

5. The fishing rod holder as set forth in claim 4, wherein:
said support pedestal further includes a pedestal with a pivot post, and wherein
said mount includes a centrally located bore in which said pivot post is received to allow said cradle to be selectively pivoted relative to said mount.

6. The fishing rod holder as set forth in claim 5, wherein:
said pedestal and said mount are selectively engagable, thereby preventing pivoting of said cradle relative to said mount.

7. The fishing rod holder as set forth in claim 6, wherein:
said pedestal is provided with an integrally formed downwardly disposed notched gear surrounding said post and said mount is provided with an upwardly disposed notched recess adapted to engagingly receive said notched gear, said support pedestal being movable between a pivotable position where said notched gear is lifted from engagement with said notched recess and said cradle may be pivoted with respect to said support pedestal, and a nonpivotable position where said notched gear is engaged with said notched recess thereby preventing said cradle from being pivoted with respect to said support pedestal.

8. The fishing rod holder as set forth in claim 7, wherein:
said cradle, said support pedestal and said mount are molded from a polymeric material.

9. The fishing rod holder as set forth in claim 8, wherein:
said cradle is provided a generally cylindrical elongated shape and includes an elongated slot extending lengthwise thereof and an arcuately shaped clamp rotatably mounted on said cradle, said clamp having spaced ends defining a gap therebetween, said clamp rotatable between an unlocked position wherein said gap is aligned with said slot of said cradle and a locked position wherein said gap is not aligned with said slot of said cradle.

10. The fishing rod holder as set forth in claim 7, wherein:
said cradle includes a notch within said slot.

11. The fishing rod holder as set forth in claim 1, wherein:
said actuator lever of said quick-release connector is provided a pivot socket and said second end of said pin is provided with a rounded head, whereby said pivot socket of said actuator level pivots about said rounded head of said pin.

12. The fishing rod holder as set forth in claim 1, further including:
a spring located between said first and second ratchet halves, said spring biasing said first and second ratchet halves towards the separated position when said actuator lever is in said unlocked position.

13. The fishing rod holder as set forth in claim 1, wherein said support pedestal further includes a pedestal that includes a pivot post, and wherein said:

mount includes a centrally located bore that is adapted to receive said pivot post therein;

thereby allowing said cradle to be pivoted relative to said mount.

14. The fishing rod holder as set forth in claim 13, wherein:

said pedestal and said mount are selectively engagable, thereby preventing pivoting of said cradle relative to said mount.

15. The fishing rod holder as set forth in claim 14, wherein:

said pedestal is provided with an integrally formed downwardly disposed notched gear surrounding said post and said mount is provided with an upwardly disposed notched recess adapted to engagingly receive said notched gear, said support pedestal being movable between a pivotable position where said notched gear is lifted from engagement with said notched recess and said cradle may be pivoted with respect to said support pedestal, and a nonpivotable position where said notched gear is engaged with said notched recess, thereby preventing said cradle from being pivoted with respect to said mount.

16. The fishing rod holder as set forth in claim 1, wherein:

said cradle, said support pedestal and said mount are molded from a polymeric material.

17. The fishing rod holder as set forth in claim 1, wherein:

said cradle is provided a generally cylindrical elongated shape and includes an elongated slot extending lengthwise thereof and an arcuately shaped clamp rotatably mounted on said cradle, said clamp having spaced ends defining a gap therebetween, said clamp rotatable between an unlocked position wherein said gap is aligned with said slot of said cradle and a locked position wherein said gap is not aligned with said slot of said cradle.

18. The fishing rod holder as set forth in claim 1, wherein:

said cradle is provided with a generally cylindrical elongate shape and includes an elongated slot extending lengthwise thereof and at least one notch located along said slot adapted to receive a support of a fishing reel therein.

19. The method for adjusting a fishing rod holder comprising:

providing a cradle shaped to receive and selectively retain a fishing rod therein, and having a first ratchet half thereon;

providing a support pedestal having a first support pedestal half for attaching the fishing rod holder to a support surface, and including a second ratchet half shaped to selectively lockingly engage with the first ratchet half;

providing a quick-release connector mechanism including an actuator pin extending centrally between the first and second ratchet halves, and rotatably connecting the cradle with the support to permit mutual rotation between a variety of different cradle positions, the actuator pin having a first end associated with one of the cradle and the support pedestal, and a second end associated with the other of the cradle and the support pedestal, and an actuator lever pivotally connected with the second end of the actuator pin, and having a cam configured to selectively engage the other of the cradle and the support pedestal when rotated to a locked position wherein the first and second ratchet halves are converged to retain the cradle at a preselected position relative to the support pedestal; and angularly adjusting the cradle relative to the support pedestal by rotating the actuator lever to the unlocked position, rotating the cradle, and rotating the actuator lever to the locked position.

20. The method as set forth in claim 19, wherein:

said step of providing a quick-release connector mechanism includes providing the cam such that the cam includes a first cam surface and a second cam surface, the first cam surface engaging the support pedestal when the actuator lever is in the locked position, and the second cam surface engaging the support pedestal when the actuator lever is in the unlocked position.

21. The method as set forth in claim 19, further including:

providing a spring located between the first and second ratchet halves wherein the spring biases the first and second ratchet halves towards the separated position when the actuator lever is in the unlocked position.

22. The method as set forth in claim 19, wherein said step of providing a quick-release connector mechanism includes providing the actuator lever of the quick-release connector with a pivot socket and said second end of said pin with a rounded head, whereby the pivot socket of the actuator lever pivots about said rounded head of the pin.

23. The method as set forth in claim 19, wherein said step of providing a quick-release connector mechanism includes providing a bowl-shaped retainer having a centrally located bore, and providing the actuator lever with a bowl-shaped socket, the retainer being held with the socket by the second end of the pin, thereby allowing the actuator lever to be rotated about the retainer.

24. The method as set forth in claim 19, wherein:

said step of providing the support pedestal includes providing a first pedestal support half and a second pedestal support half, the first pedestal support half having a centrally located bore and adapted for connection to a surface, and the second support pedestal half having a pivot post received within the first support pedestal half, thereby allowing the cradle to be pivoted relative to the first support pedestal half.

25. The method as set forth in claim 24, wherein:

said step of providing the support pedestal includes providing the pedestal such that the first support pedestal half and the second support pedestal half are selectively engagable, thereby preventing pivoting of the cradle relative to the first support pedestal half.

26. The method as set forth in claim 25, wherein:

said step of providing the support pedestal includes providing the second support pedestal half with a downwardly disposed notched gear surrounding the post and providing the first support pedestal half with an upwardly disposed notched recess adapted to engagingly receive the notched gear, the second support pedestal half being movable between a pivotable position where the notched gear is lifted from engagement with the notched recess and the cradle may be pivoted with respect to the first support pedestal half, and a nonpivotable position where the notched gear is engaged with the notched recess and the cradle may not be pivoted with respect to the second support pedestal half.

27. The method as set forth in claim 19, wherein:

said step of providing the cradle includes providing the cradle with a generally cylindrical elongated shape, an elongated slot extending lengthwise the cradle, and an arcuately shaped clamp rotatably mounted on the cradle, the clamp having spaced ends defining a gap therebetween, the clamp rotatable between an unlocked position wherein the gap is aligned with the slot of the cradle and a locked position wherein the gap is not aligned with the slot of the cradle.

\* \* \* \* \*

UNITED STATES PATENT AND TRADEMARK OFFICE
CERTIFICATE OF CORRECTION

PATENT NO. : 6,302,367 B1
DATED : October 16, 2001
INVENTOR(S) : Ratza et al.

It is certified that error appears in the above-identified patent and that said Letters Patent is hereby corrected as shown below:

<u>Title page,</u>
Item [57], ABSTRACT,
Line 15, "spark" should be -- support --;

<u>Column 6,</u>
Lines 12 and 62, "level" should be -- lever --.

Signed and Sealed this

Seventh Day of May, 2002

*Attest:*

*Attesting Officer*

JAMES E. ROGAN
*Director of the United States Patent and Trademark Office*